US010496716B2

(12) United States Patent
Lytkin et al.

(10) Patent No.: US 10,496,716 B2
(45) Date of Patent: Dec. 3, 2019

(54) DISCOVERY OF NETWORK BASED DATA SOURCES FOR INGESTION AND RECOMMENDATIONS

(71) Applicant: Microsoft Technology Licensing, LLC, Redmond, WA (US)

(72) Inventors: Nikita Igorevych Lytkin, Sunnyvale, CA (US); Ajit Paul Singh, San Francisco, CA (US); Nikolai Avteniev, Brooklyn, NY (US); Eran Leshem, New York, NY (US); Brandon Duncan, San Francisco, CA (US); Kumar Hemachandra Chellapilla, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 578 days.

(21) Appl. No.: 14/841,416

(22) Filed: Aug. 31, 2015

(65) Prior Publication Data

US 2017/0061016 A1   Mar. 2, 2017

(51) Int. Cl.
  *G06F 7/00*   (2006.01)
  *G06F 17/30*   (2006.01)
  *G06F 16/9535*   (2019.01)

(52) U.S. Cl.
  CPC ................. *G06F 16/9535* (2019.01)

(58) Field of Classification Search
  CPC ............. G06F 17/30867; G06F 17/30887
  USPC ........................................... 707/722
  See application file for complete search history.

(56) References Cited

U.S. PATENT DOCUMENTS

| 8,180,804 | B1 * | 5/2012 | Narayanan | G06F 16/9535 |
| | | | | 707/798 |
| 8,234,285 | B1 | 7/2012 | Cohen | |
| 8,374,983 | B1 | 2/2013 | Pohl et al. | |
| 8,495,143 | B2 | 7/2013 | Zhou et al. | |
| 9,424,598 | B1 * | 8/2016 | Kraft | G06Q 30/0627 |
| 9,720,964 | B1 * | 8/2017 | Hansen | G06Q 30/0201 |
| 2006/0229902 | A1 | 10/2006 | Mcgovern et al. | |
| 2007/0255689 | A1 * | 11/2007 | Sun | G06F 16/951 |
| 2008/0091771 | A1 | 4/2008 | Allen et al. | |
| 2008/0215563 | A1 | 9/2008 | Shi et al. | |

(Continued)

OTHER PUBLICATIONS

"U.S. Appl. No. 14/811,295, Non Final Office Action dated Aug. 10, 2018", 19 pgs.

(Continued)

*Primary Examiner* — Binh V Ho
(74) *Attorney, Agent, or Firm* — Schwegman Lundberg & Woessner, P.A.

(57) ABSTRACT

Disclosed in some examples are methods, systems, and machine-readable mediums which automatically determine network-based data sources for information ingestion and profile data completion. This method can be applied to automatically increase the library of network-based data sources utilized by the system to ingest profile information. This allows for more a complete tracking of member accomplishments and attributes and ultimately, allows for more complete member profiles. Before specific methods and systems for automatically determining network-based data sources are discussed, an overview of the process of ingesting information from network-based data sources and matching that information to members of the social networking service will be described.

21 Claims, 4 Drawing Sheets

(56) References Cited

U.S. PATENT DOCUMENTS

| | | |
|---|---|---|
| 2010/0010993 A1 | 1/2010 | Hussey, Jr. et al. |
| 2010/0089020 A1 | 4/2010 | Barton et al. |
| 2010/0119053 A1 | 5/2010 | Goeldi |
| 2011/0040586 A1 | 2/2011 | Murray et al. |
| 2011/0252027 A1 | 10/2011 | Chen et al. |
| 2011/0270816 A1* | 11/2011 | Gossel ............... G06F 16/951 707/706 |
| 2012/0041972 A1 | 2/2012 | Goldberg |
| 2012/0054065 A1* | 3/2012 | Sung ................. G06Q 30/02 705/26.7 |
| 2012/0078953 A1* | 3/2012 | Araya ............. H04N 5/44543 707/769 |
| 2012/0110071 A1* | 5/2012 | Zhou .................. G06Q 10/10 709/204 |
| 2012/0173289 A1 | 7/2012 | Pollard et al. |
| 2012/0303659 A1 | 11/2012 | Erhart et al. |
| 2012/0316940 A1* | 12/2012 | Moshfeghi ........... G06Q 30/02 705/14.16 |
| 2013/0031090 A1* | 1/2013 | Posse .................. H04L 67/22 707/723 |
| 2013/0110827 A1* | 5/2013 | Nabar ............... G06F 16/9535 707/728 |
| 2013/0218965 A1 | 8/2013 | Abrol et al. |
| 2013/0226709 A1* | 8/2013 | Chou ................... G06Q 30/02 705/14.66 |
| 2013/0263018 A1* | 10/2013 | Xiong ................ H04N 21/458 715/753 |
| 2013/0268373 A1* | 10/2013 | Grishaver ............ G06Q 30/02 705/14.67 |
| 2013/0282811 A1 | 10/2013 | Lessin et al. |
| 2014/0006012 A1 | 1/2014 | Zhou et al. |
| 2014/0013244 A1 | 1/2014 | Lindsay et al. |
| 2014/0052688 A1 | 2/2014 | Bansal |
| 2014/0074928 A1* | 3/2014 | B'Far .................. H04L 67/306 709/204 |
| 2014/0108445 A1* | 4/2014 | Oztekin ............. G06F 16/90324 707/767 |
| 2014/0129631 A1* | 5/2014 | Jayaram ............... G06Q 50/01 709/204 |
| 2014/0143228 A1* | 5/2014 | Blue ................. G06F 15/17306 707/709 |
| 2014/0143352 A1* | 5/2014 | Yegnashankaran ..... H04L 51/20 709/206 |
| 2014/0149507 A1* | 5/2014 | Redfern ............... H04L 65/00 709/204 |
| 2014/0149510 A1* | 5/2014 | Sundaresan ......... H04L 65/403 709/204 |
| 2014/0156681 A1* | 6/2014 | Lee .................... G06F 16/9535 707/754 |
| 2014/0164416 A1 | 6/2014 | Hosseini et al. |
| 2014/0164512 A1* | 6/2014 | Allen .................. H04L 67/22 709/204 |
| 2014/0214825 A1 | 7/2014 | Zhang et al. |
| 2014/0214945 A1* | 7/2014 | Zhang ................ H04L 67/306 709/204 |
| 2014/0245188 A1 | 8/2014 | Berger et al. |
| 2014/0245189 A1 | 8/2014 | Berger et al. |
| 2014/0279299 A1 | 9/2014 | Erenrich |
| 2014/0279722 A1 | 9/2014 | Singh et al. |
| 2014/0288999 A1 | 9/2014 | Ovadia Amsalem et al. |
| 2014/0324846 A1* | 10/2014 | Rekhi .................. G06Q 10/10 707/725 |
| 2014/0365484 A1 | 12/2014 | Freeman |
| 2015/0100538 A1 | 4/2015 | Chung et al. |
| 2015/0100539 A1 | 4/2015 | Chung et al. |
| 2015/0199437 A1* | 7/2015 | Sherman ............. G06F 16/9535 707/733 |
| 2015/0254575 A1 | 9/2015 | Nere et al. |
| 2015/0347917 A1 | 12/2015 | Hua et al. |
| 2016/0004970 A1* | 1/2016 | Lu ...................... G06Q 30/02 706/12 |
| 2016/0308998 A1* | 10/2016 | Bonmassar ........... H04L 67/327 |
| 2017/0004452 A1 | 1/2017 | Feng et al. |
| 2017/0004587 A1 | 1/2017 | Pruett et al. |
| 2017/0006421 A1 | 1/2017 | Jerez et al. |
| 2017/0024657 A1 | 1/2017 | Sahu et al. |
| 2017/0032275 A1 | 2/2017 | Lytkin et al. |
| 2017/0206557 A1 | 7/2017 | Abrol et al. |
| 2017/0235836 A1 | 8/2017 | Wang et al. |
| 2017/0344572 A1 | 11/2017 | Peterson et al. |
| 2018/0025069 A1 | 1/2018 | Kataria |

OTHER PUBLICATIONS

"User profile matching in social networks", In Network-Based Information Systems (NBiS), (2010), 297-304.

Bartunov, S, et al., "Joint link-attribute user identity resolution in online social networks", In Proceedings of the 6th International Conference on Knowledge Discovery and Data Mining, Workshop on Social Network Mining and Analysis. ACM., (2012).

Van Noorden, Richard, "Online collaboration: Scientists and the social network", Nature, 512(7513) doi: 10.1038/512126a, (2014), 126-129.

"Final Office Action Issued in U.S. Appl. No. 14/811,295", dated Mar. 14, 2019, 19 Pages.

\* cited by examiner

DISCOVERY OF NETWORK BASED DATA SOURCES FOR INGESTION AND RECOMMENDATIONS

TECHNICAL FIELD

Embodiments pertain to network-based data processing and information systems. Some embodiments relate to selection of network-based data sources.

BACKGROUND

A social networking service is a computer or web-based service that enables users to establish links or connections with persons for the purpose of sharing information with one another. Some social network services aim to enable friends and family to communicate and share with one another, while others are specifically directed to business users with a goal of facilitating the establishment of professional networks and the sharing of business information. For purposes of the present disclosure, the terms "social network" and "social networking service" are used in a broad sense and are meant to encompass services aimed at connecting friends and family (often referred to simply as "social networks"), as well as services that are specifically directed to enabling business people to connect and share business information (also commonly referred to as "social networks" but sometimes referred to as "business networks" or "professional networks").

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
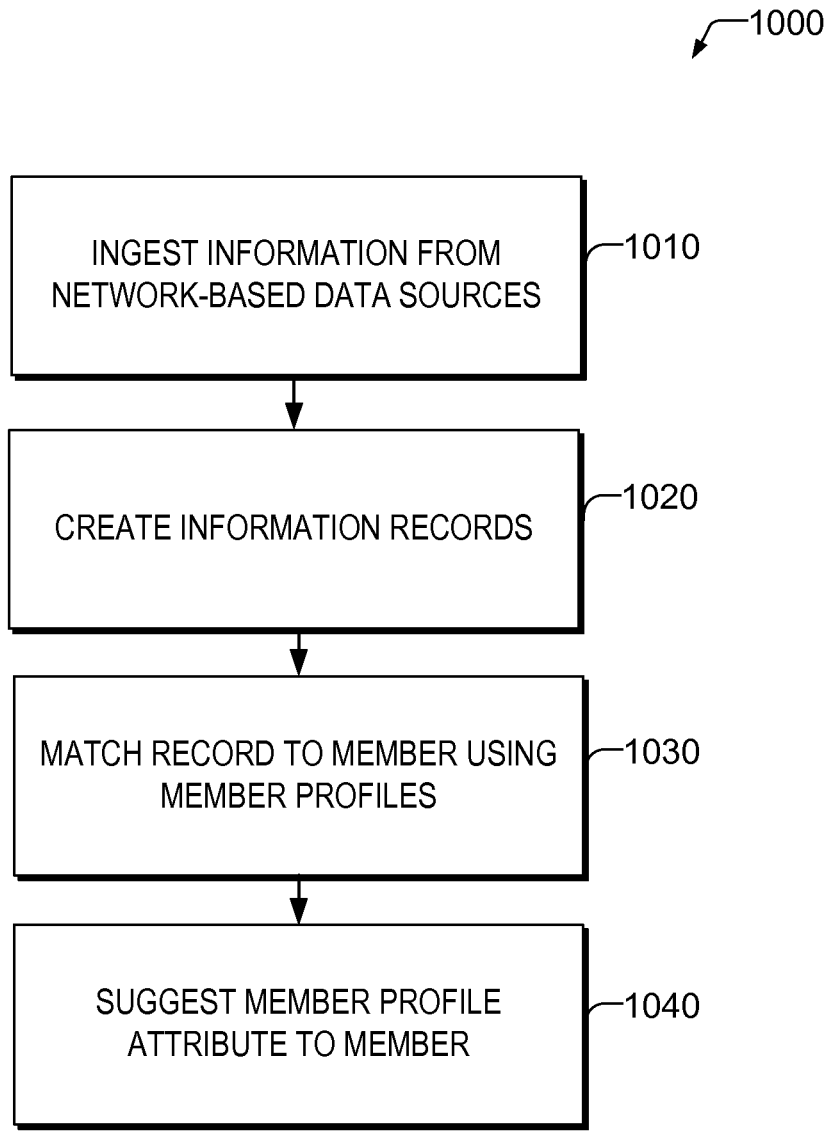
FIG. 1 shows a flowchart of a method of suggesting a member profile attribute to a member, according to some examples of the present disclosure.

In the following, a detailed description of examples will be given with references to the drawings. It should be understood that various modifications to the examples may be made. In particular, elements of one example may be combined and used in other examples to form new examples.

Many of the examples described herein are provided in the context of a social or business networking website or service. However, the applicability of the inventive subject matter is not limited to a social or business networking service. The present inventive subject matter is generally applicable to a wide range of information and networked services. For example, online job boards where users can view or post resumes and employers can post job openings.

A social networking service is a type of networked service provided by one or more computer systems accessible over a network that allows members of the service to build or reflect social networks or social relations among members. Members may be individuals or organizations. Typically, members construct profiles, which may include personal information such as the member's name, contact information, employment information, photographs, personal messages, status information, multimedia, links to web-related content, blogs, and so on. In order to build or reflect the social networks or social relations among members, the social networking service allows members to identify, and establish links or connections with other members. For instance, in the context of a business networking service (a type of social networking service), a member may establish a link or connection with his or her business contacts, including work colleagues, clients, customers, personal contacts, and so on. With a social networking service, a member may establish links or connections with his or her friends, family, or business contacts. While a social networking service and a business networking service may be generally described in terms of typical use cases (e.g., for personal and business networking respectively), it will be understood by one of ordinary skill in the art with the benefit of Applicant's disclosure that a business networking service may be used for personal purposes (e.g., connecting with friends, classmates, former classmates, and the like) as well as, or instead of, business networking purposes; and a social networking service may likewise be used for business networking purposes as well as or in place of social networking purposes. A connection may be formed using an invitation process in which one member "invites" a second member to form a link. The second member then has the option of accepting or declining the invitation.

In general, a connection or link represents or otherwise corresponds to an information access privilege, such that a first member who has established a connection with a second member is, via the establishment of that connection, authorizing the second member to view or access certain non-publicly available portions of their profiles that may include communications they have authored. Example communications may include blog posts, messages, "wall" postings, or the like. Of course, depending on the particular implementation of the business/social networking service, the nature and type of the information that may be shared, as well as the granularity with which the access privileges may be defined to protect certain types of data may vary.

Some social networking services may offer a subscription or "following" process to create a connection instead of, or in addition to the invitation process. A subscription or following model is where one member "follows" another member without the need for mutual agreement. Typically in this model, the follower is notified of public messages and other communications posted by the member that is followed. An example social networking service that follows this model is Twitter®—a micro-blogging service that allows members to follow other members without explicit permission. Other connection-based social networking services also may allow following-type relationships as well. For example, the social networking service LinkedIn® allows members to follow particular companies.

Members may store information about themselves in their member profiles as attributes of the member profiles. Members may not always fully complete their member profiles, or may forget to update their member profiles when they have achieved a particular accomplishment. For example, a member may have an article published and may not add a profile attribute in their member profile to reflect this achievement. As another example, a member may receive a patent on an invention and may not add a profile attribute in their member profile to reflect this achievement. Both members and the social networking service benefit from members having complete member profiles. Members often search for and connect with other members that have certain profile attributes. Complete member profiles enable a more accurate search. In addition to members, recruiters and other third parties may make use of the member search functionality in looking for job candidates. In addition, many members utilize their member profiles as resumes, and having an up-to-date resume ensures that accomplishments do not get forgotten when the member needs to use the resume. Despite these benefits, members may not have time or remember to update their member profiles.

In some examples, the social networking service may utilize information ingested from publicly available network-based data sources to automatically suggest adding additional attributes to member profiles of a social networking service. For example, the social networking service may assist the member in automatically completing and maintaining an up-to-date profile. This system ingests information from one or more publicly available network-based data sources (data sources that are different from the social networking service), creates information records that describe potential member profile attributes using that ingested data, identifies members of the social networking service that are associated with the information records using information in the information records and pre-existing member profile attributes, and then prompts one or more members to add the potential attributes to their profiles. The potential member profile attributes may be related to one or more member accomplishments.

As an example, the system may ingest publication information (e.g., citations to publications, content of publications, and the like) from a web site that posts publications, citations to publications, or both. The system may then create a record from that information which describes one of the publications that are described by the publication information ingested from the web site. The publication may have one or more authors. The social networking service may identify one or more members of the social networking service that are the authors of the publication and prompt those members to add information about the publication to their member profiles. These members may then quickly and easily add the attribute by clicking on an "accept" or "yes" button. If the member accepts, the publication is added to a publications section of their member profile.

The effectiveness of the profile completion methods and systems depends upon both how much information is obtained from the network-based data sources and also upon how effective the system is at matching information obtained from the network based data sources to member profiles. Methods of matching information records to member profiles is described in U.S. patent application Ser. No. 14/811,295, entitled "Entity Matching for Ingested Profile Data" to Lytkin et al filed on Jul. 28, 2015, the entirety of which is incorporated by reference herein.

Disclosed in some examples of the present disclosure are methods, systems, and machine-readable mediums which automatically determine network-based data sources for information ingestion and profile data completion. This method can be applied to automatically increase the library of network-based data sources utilized by the system to ingest profile information. This allows for more a complete tracking of member accomplishments and attributes and ultimately, allows for more complete member profiles. Before specific methods and systems for automatically determining network-based data sources are discussed, an overview of the process of ingesting information from network-based data sources and matching that information to members of the social networking service will be described.

Ingestion of Information for Profile Completion

Turning now to FIG. 1, a method 1000 of suggesting a member profile attribute to a member is shown according to some examples of the present disclosure. At operation 1010 the social networking service may ingest information from network-based data sources. Example network-based data sources include publication databases, patent databases, citation databases, university databases, library databases, or any other network-based source hosting data that may relate to a potential attribute of a member such as a member's professional achievement. In some examples, as will be explained later, the methods disclosed herein may be adapted for use in producing content recommendations to members. In these examples, the network based-data sources may be a source of content.

Information may be ingested by extraction engines which may be custom modules which are designed for each network-based data source based upon the specific content and format of the network-based data source. The extraction engines may scrape a web page of the data source, such as by extracting information from Hyper Text Markup Language (HTML), an eXtensible Markup Language (XML), JavaScript, or other web components. For example, the extraction engines parse the HTML or XML describing a public user interface of the network-based data source looking for particular, predefined text and then extract that text. Text may be found based upon contextual cues (e.g., the page may say "Author: Ted Jones") whereby the extraction engine searches for the particular contextual cues (e.g., the string "Author") and then extracts the text that follows until another contextual cue (e.g., a period or other punctuation marking the end of the author list). Contextual cues may also be structural cues, such as particular markup tags or location based cues (e.g., the desired text may be at a particular location in the document).

At operation 1020, the extraction engines create one or more information records from the extracted data. The information record is a data structure describing information about possible member profile attributes provided by the extracted information from the network-based data source. The information record stores the extracted information in a structured manner. For example, multiple publications or other content, may be described by information retrieved from the external data source. Each publication will correspond to an information record. For publications, the information record may contain one or more of: the name of the authors, the year published, the publication it was published in, information about the authors (other publications, contact information such as email address, institutional affiliations, and the like), the title, a subject, an abstract, and the like. For patents, the information record may contain one or more of: inventors, the assignee, the year granted, the year filed, the title, the abstract, and the like.

At operation 1030, the information records are matched to one or more member profiles of the social networking service. A machine learning algorithm is used to build an information model that is then used to compute a probability score that each member of the social networking service is associated with the information record. The machine learning algorithm takes as an input the information record, member profile, and in some examples: profiles of this member's connections, and any other data from the social network identified by the machine learning algorithm as relevant to the given predictive task. The machine learning algorithm then produces a probability score. More information on the selection and matching is provided in U.S. patent application Ser. No. 14/811,295.

The machine learning algorithm may produce a probability score by first creating a feature vector. The feature vector may be a data structure describing various features of similarity between member profile attributes of the particular member and the information record. Features may include a similarity between the name of the member and an author of the publication or inventor of the patent, a similarity score between connections of the member and co-authors or co-inventors, a similarity score between a geography associated with the publication or patent and a geography of the member as expressed in a member's profile, a similarity score between keywords in the publication or patent (keywords may be determined using a Term Frequency, Inverse Document Frequency (TF-IDF) metric) and skills in the member's profile, a similarity score between the title of the publication or patent and titles of other publications shown in the member's profile, similarity scores between companies and educational institutions on the member's profile and author affiliations on the publication, similarity scores between companies and educational institutions on profiles of the member's connections and author affiliations on the publication. Other features may include member educational degrees (e.g., MD, PhD), fields of study, current and past industries of employment, names of past and present employers, skills, a match between an email address or other contact information in the information record, whether or not co-inventors or co-authors are connections on the social networking service, and the like. Similar features can be derived from profiles of member's connections (educational levels, fields of study, past and current employers, etc.).

Similarity scores may be calculated in a number of different ways, including calculating tf-idf scores for each term of each field being compared (both the information record and the member profile attribute) and then doing a cosine similarity based upon the vector of tf-idf terms for each field. Other similarity scores may include an edit distance that counts the minimum number of operations to transform one string into another; cosine, Euclidean, and other vector distances between character n-gram histograms; binary indicators of commonality between the information record and member attributes (e.g., overlap in names of employers the member worked at and authors' affiliations on the information record); as well as Jaccard and other set similarity coefficients (e.g., for computing a similarity score between a set of skills on the member's profile and those associated with the information record). For locations, a geographical distance metric may quantify a distance between two locations based upon the number of miles they are apart.

Once the similarity scores for a member are calculated, in some examples, they are put into a vector (the feature vector) with each feature being a dimension of the vector. In some examples the feature vector is multiplied by the dot product of a vector of weights that represent the learned information model to calculate the score for the [information record, member profile] pair. The score represents a probability that the information record corresponds to the member. The weights in the vector of weights quantify a learned importance of each particular feature at determining a score. In some example machine learning algorithms, the feature vector is not multiplied by a vector of weights; rather, the features are input values into a decision model. Example decision model algorithms include tree models such as decision trees and random forest classifiers.

A group of members is scored and the member(s) in the group with the highest probability scores (e.g., the top N scores, the top N above a threshold X, and the like) are then presented with a prompt or recommendation to add a profile attribute describing the information record at operation 1040. The user then can accept, decline, or ignore the suggestion. If the user accepts the suggestion the member profile attribute is added to the member profile. In some examples, the score may have to be greater than a predetermined threshold confidence level before a member is given a recommendation to add the attribute.

In some examples, to build the vector of weights, the system determines training data with positive (the member matches the information record) and negative (the member does not match the information record) examples. In some examples, the training data is selected from a set of data taken from one or more network-based data sources. Positive examples may be manually determined (e.g., a human may select [information record, member] pairs), or may be created from cases where there are exact matches between a field in the information record and the member profile that is highly associative of a positive match. For example, if the information record is for a publication, the information record has an email address that is the contact of an author, and an email in the member profile matches that email address, the social networking service has a high confidence value that the member was an author of the paper. In some examples, negative examples may also be formed this same way, except that the social networking service breaks the match;—that is, it forms pairs of [information record, member profile] together that do not have email matches.

This training data is applied as input to a machine learning algorithm which produces an information model. For example, a vector of weights that describe the importance of a particular feature to the overall conclusion that the member is likely to be associated with the information record. In other examples, a decision tree (or multiple decision trees in the case of a random forest classifier) may be built. Example algorithms include logistic regression, linear regression, support vector machines, and the like.

Automatically Determining Network-Based Data Sources

To determine the external, publicly available, network-based data sources, the social networking service utilizes information from member profiles. While one of the goals of the present disclosure is to enable more complete profiles of members of the social networking service, some members may already be listing publications and patents in their profiles. They may or may not provide a direct URL link to the publication on a network-based data source. If they provide a direct URL link, that URL may be utilized by the social networking service as a network-based data source. This network based data source may then contain other publications of members which may then be suggested to those members. If they simply provide publication information (e.g., title, publication, date, authors) or even the article itself, this information is utilized to find a publicly available network based data source containing the publication. This network based data source may then contain other publications of members which may then be suggested to those members. Additionally, members of the social networking service may be grouped by some common pre-determined characteristic (e.g., by industry of employment). Member profile features common to the group of members of the social networking service may also be used to find network based data sources for publications for that group. Keywords common to a group of members may lead to content that would be likely written by members of that group.

Figure 2:
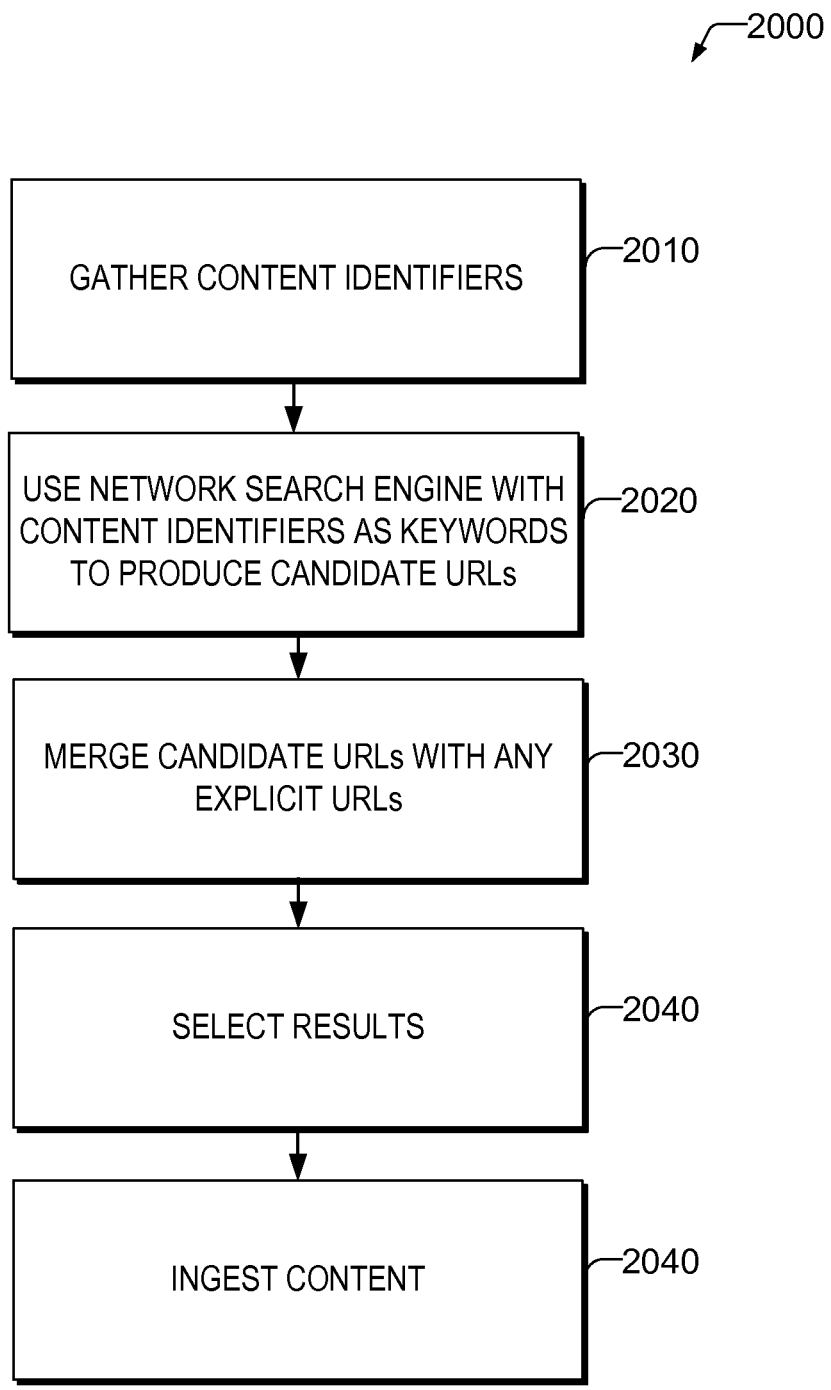
FIG. 2 shows a flowchart of a method of automatically determining external network-based information sources according to some examples of the present disclosure.

FIG. 2 shows a method of determining a set of external network-based data sources 2000 according to some examples of the present disclosure. At operation 2010 the system gathers identifiers of content. Identifiers of content may be any word or phrase used by the social networking service to identify content using a search engine. These identifiers may then be issued to a search engine to identify sources of that content. Identifiers may be words or phrases taken from member profiles; articles associated with member profiles; meta data about the articles or about the member profiles (e.g., article titles, abstracts, and the like); or the like. Identifiers of content may include article titles, publication titles, text and phrases from articles, attributes representing shared groups of members, and the like.

As already noted, identifiers of content may be words or phrases in articles members have authored. The articles may be sourced from previous content ingestions, uploaded by the member manually to the social networking service, or the like. Words or phrases from the article may be selected based upon relevance for finding new articles that are similar to the article. For example, terms with the highest term frequency-inverse document frequency (tf-idf) score may be utilized as content identifiers. Tf-idf is a numerical statistic that is intended to reflect how important a word is to a document in a collection. The collection used in the tf-idf calculation may include only the document itself, documents in a group of related documents, or all documents selected by the social networking service.

In other examples, members may be grouped in the social networking service based upon one or more shared member profile attributes. Example shared member profile attributes include skills, industry, employment, education, and the like. In these examples, the identifiers of content may include the shared member profile attributes, or other member profile attributes of members of the group. For example, skills of the group of members may be used as content identifiers. In other examples, the identifiers may include profile keywords that differentiate the group of members from most other members of the social networking service. For example, the social networking service may compare the profiles of members in the group with members who are not in the group. The terms that are more commonly associated with members in the group may be utilized as the identifiers of content. In some examples, in order to find the terms that are more commonly associated with members in the group, the social networking service may score terms in the member profiles of the group using the tf-idf statistic. The identifiers of content may be the highest scoring terms or phrases.

At operation 2020, these content identifiers are utilized as search keywords in an external network-based data source search engine. An example network-based data source search engine may be an Internet search engine such as GOOGLE. Each content identifier may be issued as a separate search query. In some examples, the search engine may be a general search engine that returns pointers (e.g., Universal Resource Locators (URL)s) to many different types of content (e.g., GOOGLE), but in other examples, the search engines may return only certain types of URLs (e.g., GOOGLE SCHOLAR returns scholarly articles). The search engine returns a list of Universal Resource Locators (URLs) that is a likely address of a network based data source. The returned URLS form a candidate set of URLs.

At operation 2030 explicit URLs gathered from member profiles are added to the candidate set of URLs. For example, a member may provide an explicit URL to a paper, patent, or other item of content in their member profiles. In this case, no search is necessary first, and the URL may be immediately added to the candidate set of URLs.

In some examples, URLs in the candidate set of URLs may be filtered. For example, URLs from known sources of content that are undesirable or inappropriate may be removed using a blacklist.

At operation 2040 the candidate list of URLs are selected to produce a results list. The result list may be selected based upon any number of criteria. For example, since the search engine returns results sorted by relevance, the relevance scores of these results may be combined across all the search queries and the top predetermined number of URLs may be utilized. URLs may be shortened such that the URL points to the address of the network based information source (e.g., "http://www.youtube.com") instead of the specific item of content ("http://www.youtube.com/watch=ABCD"). Thus, the relevance scores of all content returned by the search engine for a particular network based data sources are summed together to produce one relevance score for each network based data source. The network based data sources that score highest may be selected as network based data sources that would be crawled for content.

After the result list is determined, at operation 2040 the system may ingest content from the shortened URL (and including ingesting the content pointed to by the full URL) of each of the network based data sources in the result list. This process may then be performed using the steps shown in FIG. 1. The ingested content may include all content of the network based data source, select content, only the content pointed to by the URLs returned from the searches, and the like.

Content Recommendations

While the method herein has been described with respect to completion of member profiles, the methods herein are applicable to other uses as well. For example, content recommendation systems may also use these methods to recommend content. Rather than matching publications and other content to members on the basis of authorship, the machine learning matching algorithms are tuned to make content recommendations to users. This is done by modifying the above described steps for learning the model by labeling [information record, member profile] pairs based upon affinities for content, rather than authorship or inventorship. The model will then comprise weights that reflect the importance of each feature towards content affinity rather than authorship or attribution. The selection of publicly available network-based data sources is then be a selection of network-based data sources that have content that members may want to consume (e.g., read, share, or otherwise interact with). The same automatic external network-based data source selection mechanisms described above may be utilized in the content recommendation applications.

Example Systems

Figure 3:
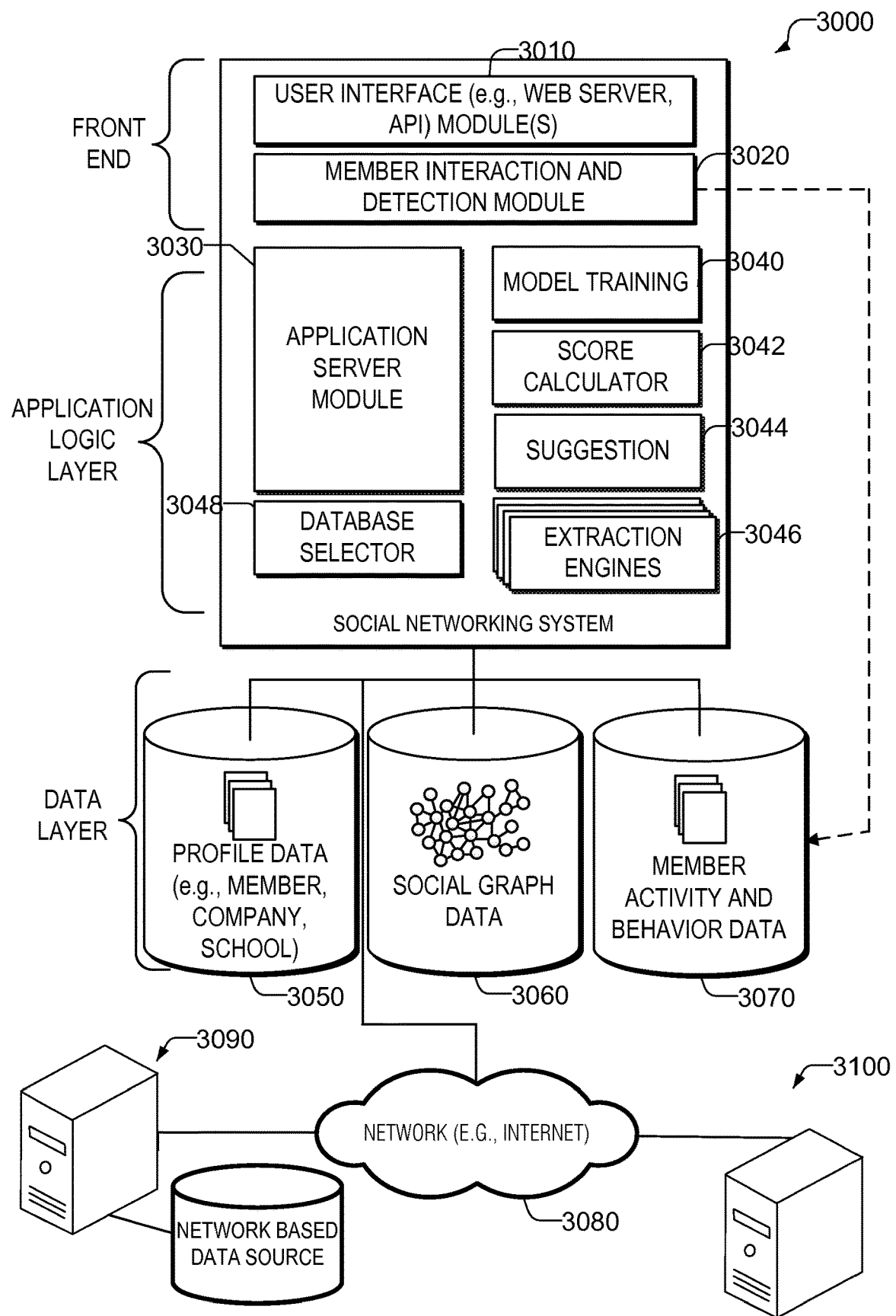
FIG. 3 is a block diagram showing the functional components of a social networking service, according to some examples of the present disclosure.

FIG. 3 is a block diagram showing the components of a social networking service 3000. As shown in FIG. 3, a front end may comprise a user interface module (e.g., a web server) 3010, which receives requests from various client-computing devices, and communicates appropriate responses to the requesting client devices. For example, the user interface module(s) 3010 may receive requests in the form of Hypertext Transport Protocol (HTTP) requests, or other network-based, application programming interface (API) requests (e.g., from a dedicated social networking service application running on a client device). In addition, a member interaction and detection module functional 3020 may be provided to detect various interactions that members have with different applications, services and content presented. As shown in FIG. 3, upon detecting a particular interaction, the member interaction and detection module 3020 logs the interaction, including the type of interaction and any meta-data relating to the interaction, in the member activity and behavior database 3070.

An application logic layer may include one or more various application server modules 3030, which, in conjunction with the user interface module(s) 3010, generate various graphical user interfaces (e.g., web pages) with data retrieved from various data sources in the data layer. With some embodiments, application server module 3030 is used to implement the functionality associated with various applications and/or services provided by the social networking service as discussed above.

Application layer may also include model training module 3040, score calculator module 3042, suggestion module 3044, extraction engines 3046, and database selector module 3048. Extraction engines 3046 may be specifically programmed modules that are specifically designed to access a particular network-based data source, for example, network based data source 3090 accessible over network 3080. For example, one extraction engine 3046 may access a particular publication server, while another extraction engine 3046 may access a different publication server. The extraction engines 3046 may communicate with the network-based data sources over a computer network (e.g., network 3080) using standard network communication protocols and may programmatically (e.g., through an Application Programming Interface—API) access the network-based data source. In other examples, extraction engines 3046 may access a public user interface (e.g., an HTML page). Extraction engines 3046 may create one or more information records corresponding to each potential member profile attribute (e.g., for each publication, patent, and the like). The information records may contain one or more attributes of the possible member profile attributes that are collected from the network-based information source. Possible member profile attributes may correspond to member achievements.

Model training module 3040 may apply a machine learning algorithm to one or more training data sets to build an information model, as detailed above. In some examples, the information model is then used by the score calculator module 3042 to calculate a score that represents a likelihood that the information record describes an attribute of a member (for example, a publication or patent authored by or invented by the member) or that a member would have an affinity for the content described by the information record (for suggesting content to the member).

The application layer may also include suggestion module 3044, which may suggest that the member with the highest score add the item to their member profile as an attribute. In some examples, the suggestion module 3044 may present, via the user interface module 3010, a graphical user interface which may contain the suggestion that the member add the attribute to their profiles. In examples for content suggestion, the suggestion module may suggest one or more items of content to the member via the user interface module 3010 in a graphical user interface.

Database selector module 3048 may select one or more network based data sources (e.g., such as network based data source 3090) based upon member profile data. For example, database selector module 3048 may determine content identifiers from member profile data. These content identifiers may be submitted to one or more external search engines 4100. External search engines 4100 may return candidate URLs. These candidate URLs may be selected by the database selector module 3048 for use by extraction engines 3046 to extract information records.

The social networking service 3000 may include a data layer that may include several other databases, such as a database 3050 for storing profile data, including both member profile attributes as well as profile data for various organizations (e.g., companies, schools, etc.). Consistent with some embodiments, when a person initially registers to become a member of the social networking service, the person will be prompted to provide some personal information, such as his or her name, age (e.g., birthdate), gender, interests, contact information, home town, address, the names of the member's spouse and/or family members, educational background (e.g., schools, majors, matriculation and/or graduation dates, etc.), employment history, skills, professional organizations, and so on. This information is stored, for example, in the database 3050. Similarly, when a representative of an organization initially registers the organization with the social networking service, the representative may be prompted to provide certain information about the organization. This information may be stored, for example, in the database 3050, or another database (not shown). With some embodiments, the profile data may be processed (e.g., in the background or offline) to generate various derived profile data. For example, if a member has provided information about various job titles that the member has held with the same company or different companies, and for how long, this information can be used to infer or derive a member profile attribute indicating the member's overall seniority level, or seniority level within a particular company. With some embodiments, importing or otherwise accessing data from one or more externally hosted data sources may enhance profile data for both members and organizations. For instance, with companies in particular, financial data may be imported from one or more external data sources, and made part of a company's profile.

Information describing the various associations and relationships, such as connections that the members establish with other members, or with other entities and objects are stored and maintained within a social graph in the social graph database 3060. Also, as members interact with the various applications, services and content made available via the social networking service, the members' interactions and behavior (e.g., content viewed, links or buttons selected, messages responded to, etc.) may be tracked and information concerning the member's activities and behavior may be logged or stored, for example, as indicated in FIG. 3 by the member activity and behavior database 3070.

With some embodiments, the social networking system 3000 provides an application programming interface (API) module with the user interface module 3010 via which applications and services can access various data and services provided or maintained by the social networking service. For example, using an API, an application may be able to request and/or receive one or more navigation recommendations. Such applications may be browser-based applications, or may be operating system-specific. In particular, some applications may reside and execute (at least partially) on one or more mobile devices (e.g., phone, or tablet computing devices) with a mobile operating system. Furthermore, while in many cases the applications or services that leverage the API may be applications and services that are developed and maintained by the entity operating the social networking service, other than data privacy concerns, nothing prevents the API from being provided to the public or to certain third-parties under special arrangements, thereby making the navigation recommendations available to third party applications and services.

Figure 4:
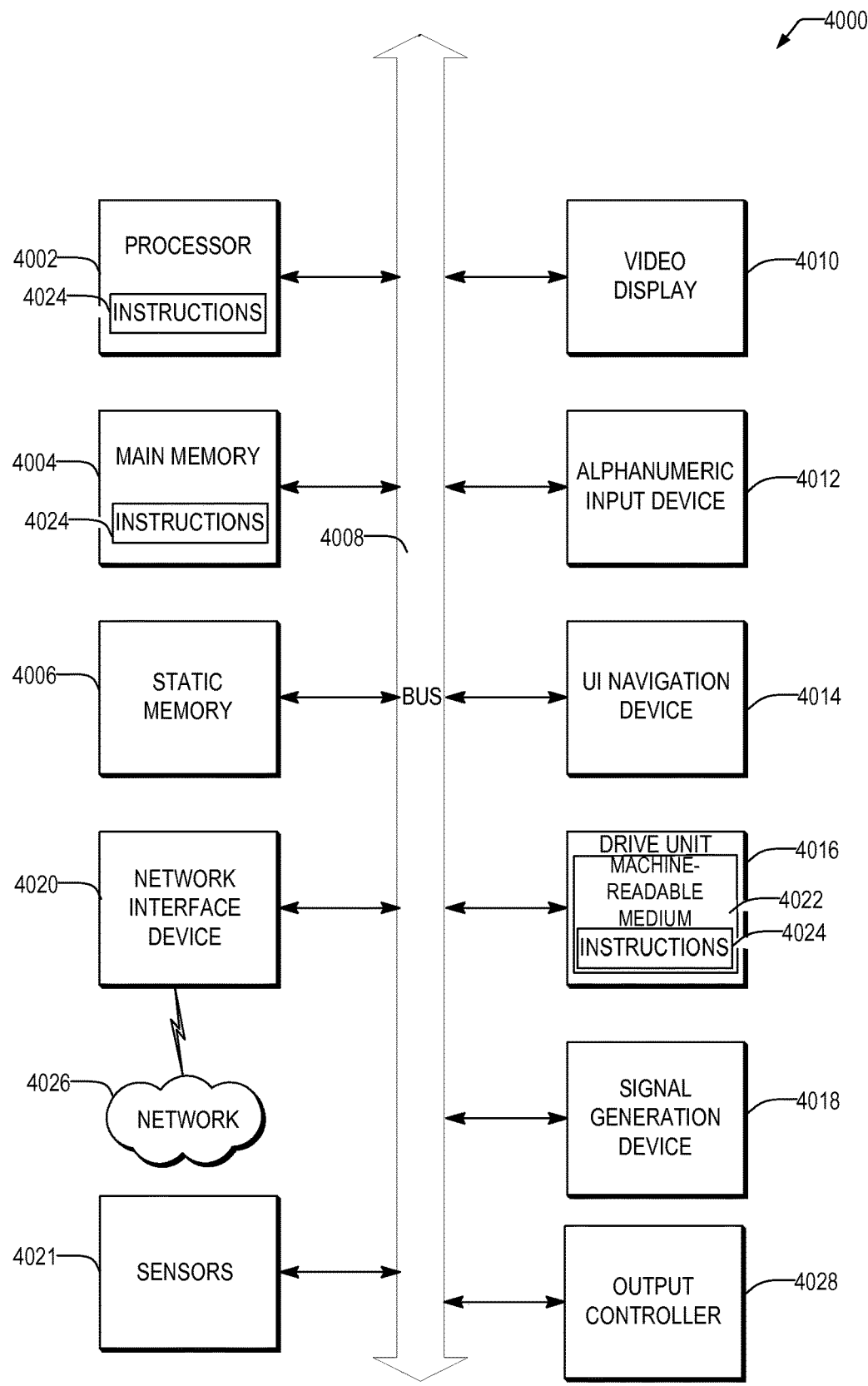
FIG. 4 is a block diagram illustrating an example of a machine upon which one or more embodiments may be implemented.

FIG. 4 illustrates a block diagram of an example machine 4000 upon which any one or more of the techniques (e.g., methodologies) discussed herein may perform. In alternative embodiments, the machine 4000 may operate as a stand-alone device or may be connected (e.g., networked) to other machines. In a networked deployment, the machine 4000 may operate in the capacity of a server machine, a client machine, or both in server-client network environments. In an example, the machine 4000 may act as a peer machine in peer-to-peer (P2P) (or other distributed) network environment. The machine 4000 may implement or include any portion of the social networking service from FIG. 3, and may take the form of a personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 4000 may include a hardware processor 4002 (e.g., a central processing unit (CPU), a graphics processing unit (GPU), a hardware processor core, or any combination thereof), a main memory 4004 and a static memory 4006, some or all of which may communicate with each other via an interlink (e.g., bus) 4008. The machine 4000 may further include a display unit 4010, an alphanumeric input device 4012 (e.g., a keyboard), and a user interface (UI) navigation device 4014 (e.g., a mouse). In an example, the display unit 4010, input device 4012 and UI navigation device 4014 may be a touch screen display. The machine 4000 may additionally include a storage device (e.g., drive unit) 4016, a signal generation device 4018 (e.g., a speaker), a network interface device 4020, and one or more sensors 4021, such as a global positioning system (GPS) sensor, compass, accelerometer, or other sensor. The machine 4000 may include an output controller 4028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 4016 may include a machine readable medium 4022 on which is stored one or more sets of data structures or instructions 4024 (e.g., software) embodying or utilized by any one or more of the techniques or functions described herein. The instructions 4024 may also reside, completely or at least partially, within the main memory 4004, within static memory 4006, or within the hardware processor 4002 during execution thereof by the machine 4000. In an example, one or any combination of the hardware processor 4002, the main memory 4004, the static memory 4006, or the storage device 4016 may constitute machine readable media.

While the machine readable medium 4022 is illustrated as a single medium, the term "machine readable medium" may include a single medium or multiple media (e.g., a centralized or distributed database, and/or associated caches and servers) configured to store the one or more instructions 4024.

The term "machine readable medium" may include any medium that is capable of storing, encoding, or carrying instructions for execution by the machine 4000 and that cause the machine 4000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 4024 may further be transmitted or received over a communications network 4026 using a transmission medium via the network interface device 4020. The Machine 4000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 4020 may include one or more physical jacks (e.g., Ethernet, coaxial, or phone jacks) or one or more antennas to connect to the communications network 4026. In an example, the network interface device 4020 may include a plurality of antennas to wirelessly communicate using at least one of single-input multiple-output (SIMO), multiple-input multiple-output (MIMO), or multiple-input single-output (MISO) techniques. In some examples, the network interface device 4020 may wirelessly communicate using Multiple User MIMO techniques.

What is claimed is:

1. A method for completing a member profile using external data sources, the method comprising:
   on a social networking service, using one or more hardware processors:
   extracting a content identifier from a member profile of a first member of the social networking service;
   submitting to an external search engine, over a computer network, the content identifier from the member profile of the first member of the social networking service;
   responsive to submitting the content identifier, receiving a plurality of universal resource locators (URLs), each respective URL describing a candidate network-based data source;
   selecting at least one of the plurality of URLs;
   receiving at least one content item from the at least one of the plurality of URLs;
   matching the at least one content item to a second member of the social networking service based upon the member profile of the second member and the at least one content item, wherein the member profile of the second member does not include the content item and wherein the first member and the second member are different members in the social networking service; and
   providing at least one graphical user interface to the second member that provides a recommendation to the second member that they add the information about the content item to the second member's member profile.

2. The method of claim 1, wherein providing at least one graphical user interface to the second member comprises providing a recommendation to the second member that the second member add information about the content item to the member profile of the second member as an accomplishment.

3. The method of claim 1, wherein providing at least one graphical user interface to the second member comprises providing a recommendation to the second member that they interact with the content item.

4. The method of claim 1, further comprising adding a URL explicitly included in a member profile of the social networking service to the candidate list.

5. The method of claim 1, wherein extracting the content identifier comprises extracting an identifier of a common characteristic of a group of members of a social networking service, the first member being in the group of members.

6. The method of claim 1, wherein the group of members is selected based upon the common characteristic.

7. The method of claim 1, wherein selecting the at least one of the plurality of URLs comprises selecting the URL with a highest relevance score.

8. A system comprising:
   a processor;
   a non-transitory computer readable medium having instructions stored thereon, which, when executed by the processor, causes the processor to perform the operations of:
   extracting a content identifier from a member profile of a first member of the social networking service;
   submitting to an external search engine, over a computer network, the content identifier from the member profile of the first member of the social networking service;
   responsive to submitting the content identifier, receiving a plurality of universal resource locators (URLs), each respective URL describing a candidate network-based data source;
   selecting at least one of the plurality of URLs;
   receiving at least one content item from the at least one of the plurality of URLs;
   matching the at least one content item to a second member of the social networking service based upon the member profile of the second member and the at least one content item, wherein the member profile of the second member does not include the content item and wherein the first member and the second member are different members in the social networking service; and
   providing at least one graphical user interface to the second member that provides a recommendation to the second member that they add the information about the content item to the second member's member profile.

9. The system of claim 8, wherein the operations of providing at least one graphical user interface to the second member comprises the operations of:
   providing a recommendation to the second member that second member add information about the content item to the member profile of the second member as an accomplishment.

10. The system of claim 8, wherein the operations of providing at least one graphical user interface to the second member comprises the operations of providing a recommendation to the second member that the second member interact with the content item.

11. The system of claim 8, wherein the operations comprise adding a URL explicitly included in a member profile of the social networking service to the candidate list.

12. The system of claim 8, wherein the operations of extracting the content identifier comprises the operations of extracting an identifier of a common characteristic of a group of members of a social networking service, the first member being in the group of members.

13. The system of claim 8, wherein the group of members is selected based upon the common characteristic.

14. The system of claim 8, wherein the operations of selecting the at least one of the plurality of URLs comprises the operations of selecting the URL with a highest relevance score.

15. A non-transitory computer readable medium having instructions stored thereon, which, when executed by the processor, causes the processor to perform the operations of:
- extracting a content identifier from a member profile of a first member of the social networking service;
- submitting to an external search engine, over a computer network, the content identifier from the member profile of the first member of the social networking service;
- responsive to submitting the content identifier, receiving a plurality of universal resource locators (URLs), each respective URL describing a candidate network-based data source;
- selecting at least one of the plurality of URLs;
- receiving at least one content item from the at least one of the plurality of URLs;
- matching the at least one content item to a second member of the social networking service based upon the member profile of the second member and the at least one content item, wherein the member profile of the second member does not include the content item and wherein the first member and the second member are different members in the social networking service; and
- providing at least one graphical user interface to the second member that provides a recommendation to the second member that they add the information about the content item to the second member's member profile.

16. The machine-readable medium of claim 15, wherein the operations of providing at least one graphical user interface to the second member comprises the operations of: providing a recommendation to the second member that the second member add infounation about the content item to the member profile of the second member as an accomplishment.

17. The machine-readable medium of claim 15, wherein the operations of providing at least one graphical user interface to the second member comprises the operations of providing a recommendation to the second member that the second member interact with the content.

18. The machine-readable medium of claim 15, wherein the operations comprise adding a URL explicitly included in a member profile of the social networking service to the candidate list.

19. The machine-readable medium of claim 15, wherein the operations of extracting the content identifier comprises the operations of extracting an identifier of a common characteristic of a group of members of a social networking service, the first member being in the group of members.

20. The machine-readable medium of claim 15, wherein the group of members is selected based upon the common characteristic.

21. The machine-readable medium of claim 15, wherein the operations of selecting the at least one of the plurality of URLs comprises the operations of selecting the URL with a highest relevance score.

* * * * *

UNITED STATES PATENT AND TRADEMARK OFFICE
CERTIFICATE OF CORRECTION

PATENT NO. : 10,496,716 B2
APPLICATION NO. : 14/841416
DATED : December 3, 2019
INVENTOR(S) : Lytkin et al.

Page 1 of 1

It is certified that error appears in the above-identified patent and that said Letters Patent is hereby corrected as shown below:

In the Claims

In Column 16, Line 2, in Claim 16, delete "infounation" and insert --information-- therefor Signed and Sealed this
Twentieth Day of October, 2020

Andrei Iancu
*Director of the United States Patent and Trademark Office*